J. M. GOFF.
Stalk-Chopper.
No. 57,893. Patented Sept. 11, 1866.
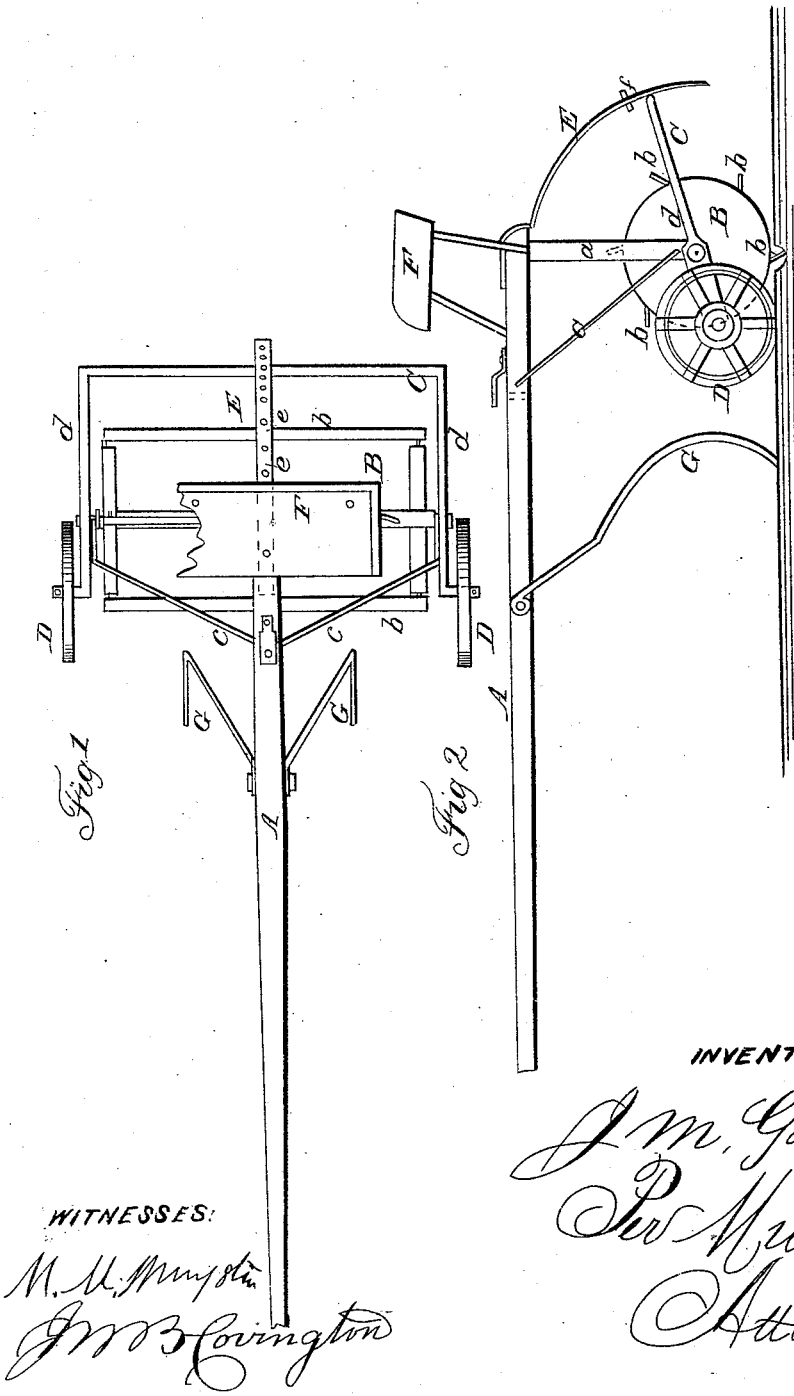
WITNESSES:
INVENTOR:

UNITED STATES PATENT OFFICE.

J. M. GOFF, OF IONIA, ILLINOIS.

IMPROVEMENT IN MACHINES FOR CUTTING STANDING CORN-STALKS.

Specification forming part of Letters Patent No. 57,893, dated September 11, 1866.

*To all whom it may concern:*

Be it known that I, J. M. GOFF, of Ionia, in the county of Warren and State of Illinois, have invented a new and Improved Machine for Cutting Standing Corn-Stalks; and I do hereby declare that the following is a full, clear, and exact description thereof, which will enable others skilled in the art to make and use the same, reference being had to the accompanying drawings, forming part of this specification, in which—

Figure 1 is a plan or top view of my invention; Fig. 2, a side view of the same.

Similar letters of reference indicate like parts.

This invention relates to a new and improved machine for cutting standing corn-stalks; and it consists in the employment or use of a cylinder of knives connected with a draft-pole and arranged with adjustable wheels, as hereinafter fully shown and described, whereby standing stalks may be cut with the greatest facility and very expeditiously, so as to effect a great saving in time and labor over the manual process for affecting the result.

A represents a draft-pole, to the rear end of which there is secured a cross-bar having a vertical or pendent arm, $a$, at each end, between the lower ends of which the axis or journals of a cutting-cylinder, B, is fitted, said cylinder having a series of knives or cutters, $b$, attached to its periphery, parallel with its axis, but projecting obliquely, as shown in Fig. 2.

The arms $a$ are braced by rods $c$ from the draft-pole A, and on the outer ends of the axis or journals of the cylinder B there is fitted a frame, C, which may be described as forming three sides of a quadrangle, the two opposite sides $d\ d$ being fitted on the journals or axis of the cylinder, extending some distance in front of it, and each having a wheel, D, attached at the front ends.

To the rear end of the draft-pole A there is firmly bolted a segment-bar, E, perforated with holes $e$, said bar being a portion of a circle of which the axis of the cylinder B is the center; and the rear side of the frame C is in contact with the under concave surface of the bar E.

F is a driver's seat on the rear end of the draft-pole A, and G G are two hooks or curved rods, which are attached one to each side of the draft-pole A.

As the machine is drawn along the two hooks G G gather any lodged stalks which may be in their path, and draw them in line with the cutting-cylinder B, so that they may be severed by the knives or cutters $b$, the wheels D being raised above the surface of the ground by depressing the rear of frame C, so that the cylinder B may bear or rest upon the surface of the ground and the cutters $b$ perform their work.

The cylinder B may be raised when not required to work—as, for instance, in drawing the machine from place to place—by elevating the rear frame, C, so that the machine may be supported by the wheels D, the frame being retained by a pin, $f$, passing through one of the holes in bar E and underneath the rear side of the frame.

The cutting-cylinder B may be composed of circular heads keyed on an axle or shaft, or it may be made solid.

This device is extremely simple, and may be constructed at a small cost.

Having thus described my invention, I claim as new and desire to secure by Letters Patent—

The knife or cutter-cylinder B, connected to the draft-pole A, substantially as shown and described, in combination with the pivoted frame C, provided with the wheels D D, and with or without the hooks G G, all being arranged to operate substantially as and for the purpose set forth.

J. M. GOFF.

Witnesses:
 C. S. HOUGHTON,
 JOHN L. GOFF.